Figure 1:
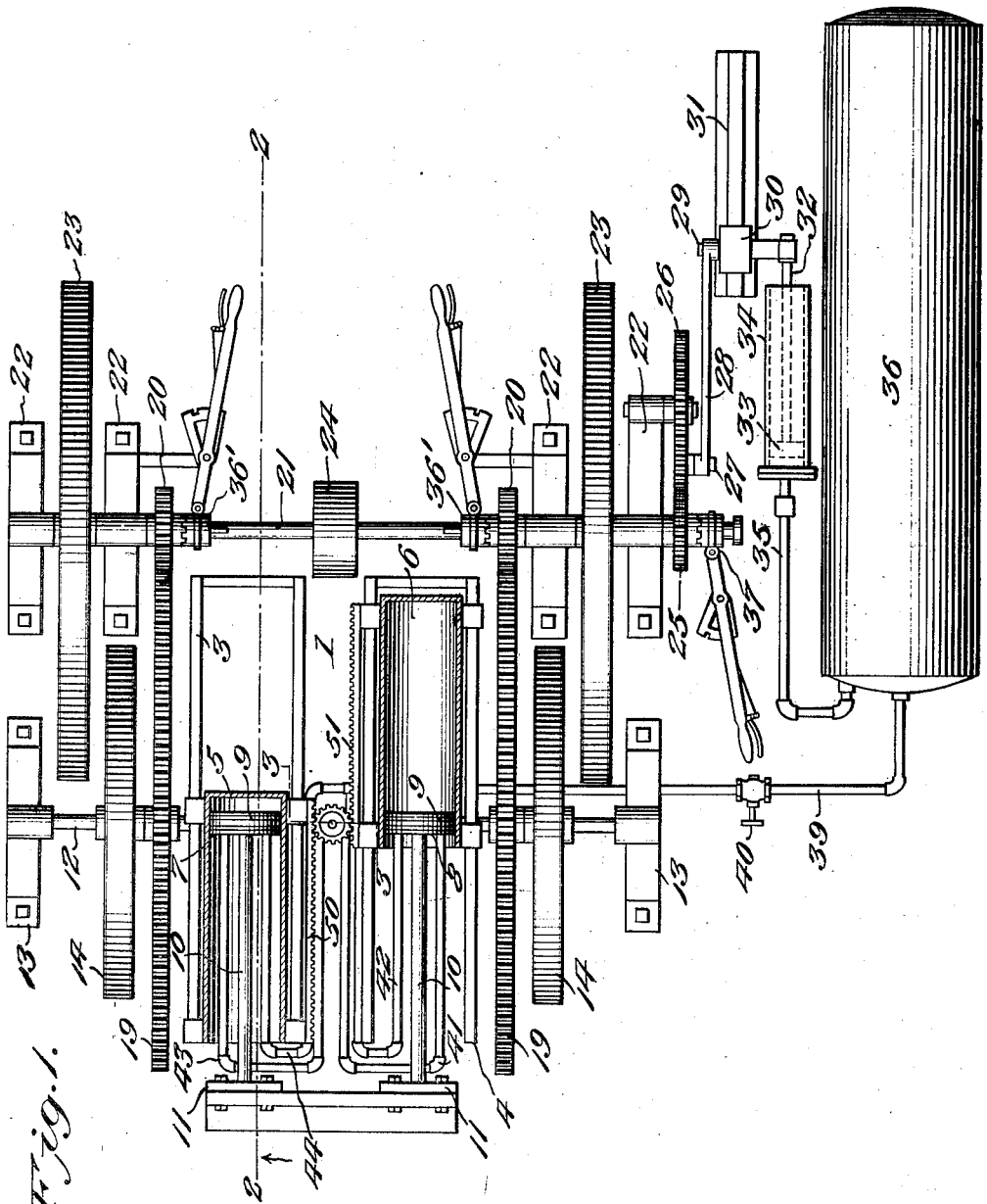

D. H. MURRAY.
COMPRESSED AIR ENGINE.
APPLICATION FILED APR. 1, 1911.

1,002,739.

Patented Sept. 5, 1911.

2 SHEETS—SHEET 1.

Witnesses
Edwin G. McKee
C. C. Hines

Inventor
Dick H. Murray

By Victor J. Evans
Attorney

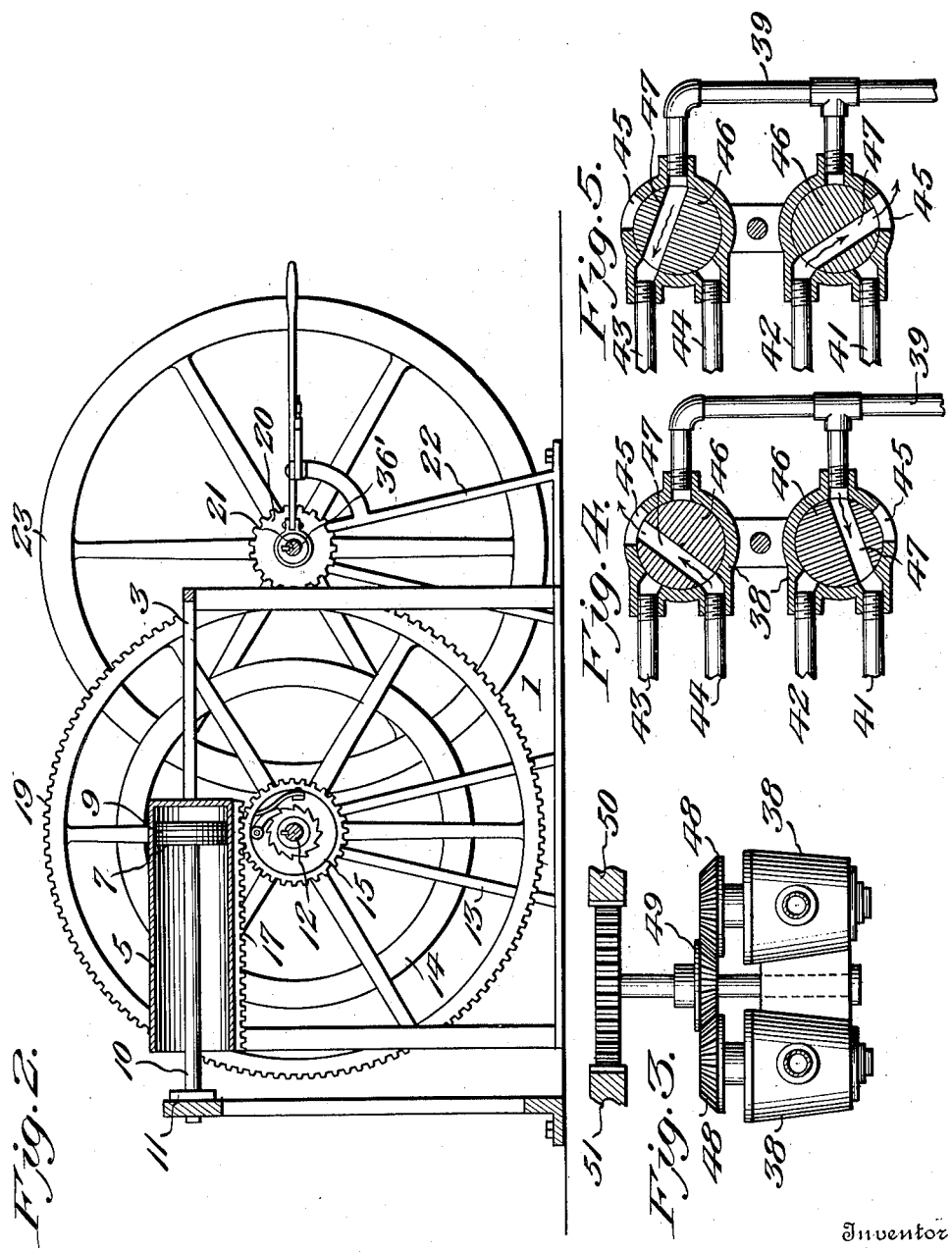

UNITED STATES PATENT OFFICE.

DICK H. MURRAY, OF HOUSTON, TEXAS.

COMPRESSED-AIR ENGINE.

1,002,739.  Specification of Letters Patent.  Patented Sept. 5, 1911.

Application filed April 1, 1911. Serial No. 618,299.

*To all whom it may concern:*

Be it known that I, DICK H. MURRAY, a citizen of the United States, residing at Houston, in the county of Harris and State of Texas, have invented new and useful Improvements in Compressed-Air Engines, of which the following is a specification.

This invention relates to compressed air engines, and its object is to provide a duplex-cylinder engine wherein a power impulse may be obtained on each half revolution of the engine shaft, whereby the air pressure may be economically employed for the transmission of power to gearing or machinery to be driven.

A further object of the invention is to provide an engine of this character wherein means are employed for recharging the air reservoir to maintain a working pressure under certain conditions of service.

The invention consists of the features of construction, combination and arrangement of parts, hereinafter fully described and claimed, reference being had to the accompanying drawings, in which:—

Figure 1 is a sectional plan view of a compressed air engine embodying my invention. Fig. 2 is a section on the line 2—2 of Fig. 1. Fig. 3 is a section on the line 3—3 of Fig. 1. Figs. 4 and 5 are sectional views of the governing valve in its different positions.

Referring to the drawings, 1 designates a suitable supporting frame, provided with guide ways 3 and 4 for a pair of reciprocating parallel cylinders 5 and 6, which are suitably mounted to travel upon the guide ways. The cylinders are adapted to move in unison in opposite directions, and each cylinder is closed at one end and open at its opposite end. Associated with the respective cylinders are pistons or abutments 7 and 8, each comprising a head 9 provided with suitable packing rings, an outwardly extending rod or stem 10, and a cross piece 11 at the outer end of said rod or stem bolted or otherwise fixed to the frame. The pistons or abutments are thus held from movement while the cylinders have a reciprocating motion. In practice, the connections between the cylinders and the guide ways are made ball bearing, so as to reduce frictional resistance in the operation of the cylinder.

Extending transversely beneath the cylinders and guide ways is the engine shaft 12 journaled at its opposite ends in suitable bearings 13 and carrying adjacent each end a fly wheel 14. Mounted on this shaft beneath the cylinders are gear pinions 15 and 16 which mesh with rack bars 17 and 18, on the respective cylinders, whereby in the operation of the cylinders motion will alternately be transmitted thereby to the shaft, which will thus be given a power impulse on each half revolution thereof. The pinions 15 and 16 have a suitable pawl and ratchet or clutch connection with the shaft, so as to turn independently of the shaft in one direction and to be fixed to communicate motion to the shaft when they are turned in the reverse direction. It will be understood, of course, that the pinions and their clutch devices are so arranged as to impart working motion to the shaft when the associated cylinder is on its working movement, and to turn freely on the shaft when the cylinder is on its inactive or return movement.

Mounted upon the shaft 12 are gear wheels 19 which mesh with gears 20 on a driving shaft 21 journaled in suitable ball bearings 22 in parallel relation to the engine shaft, and carrying fly wheels 23. On said shaft 21 is also a gear or pulley 24, whereby power may be transmitted therefrom to gearing or machinery to be driven. At one end of the shaft 21 is a gear 25 meshing with a crank gear 26, the wrist pin 27 of which is connected by a pitman rod 28 with a rod or shaft 29 provided with a cross head 30 traversing a suitable guide 31. The rod 29 is connected with the stem 32 of a pump piston 33 operating in a pump cylinder 34, connected by a check valve pipe 35 with an air reservoir 36, whereby through the operation of the gearing just described the pump may be operated to supply compressed air to the tank for use as the medium for driving the motor cylinders. Clutches 36' may be provided to throw the gears 20 into and out of mesh with the gears 19, and a clutch 37 is provided for throwing the gearing 25 into and out of mesh with the gear 26. Hence, under certain conditions the pumps may be operated to replenish the air tank or reservoir, as in the application of the motor to a vehicle, when the vehicle is descending a grade by the force of gravity.

Leading from the storage reservoir or tank 36 to valve casings 38 disposed at a point between the cylinders is an air feed or supply pipe 39 having a controlling valve 40 therein, whereby the feed of the fluid pressure may be cut off or controlled at any time in the operation of the engine. Also connected with the respective valve casings are sets of inlet and exhaust pipes 41 and 42 and 43 and 44, respectively, the pipes 41 and 42 being connected with one valve casing and the pipes 43 and 44 with the other valve casing at points opposite the points of communication of the pipe 39 with said casings, each of which latter is provided with a suitably arranged exhaust port 45. Arranged within each valve casing is a rotary plug valve 46 having a passage 47 adapted in one position to connect the feed pipe with the inlet pipe 41 or 43, and in its reverse position to connect the exhaust port 45 with the exhaust pipe 42 or 44. Each valve has an upwardly projecting stem carrying at its upper end a bevel gear wheel 48, which wheels mesh with the beveled toothed portion of an intermediate gear wheel 49, which is also provided with spur gear teeth meshing with rack bars 50 and 51, connected with the respective cylinders 5 and 6, so that in the operation of the cylinders motion will be transmitted to the valves 46 to effect the feed of fluid pressure to and its exhaust from the cylinders. The valves move in opposite directions to each other to their respective feed and exhaust positions, so that when one valve is in position to allow fluid pressure to pass to one cylinder the other valve will be in exhaust position, and vice versa. The pipes 41 and 42 have portions arranged parallel with the stem of the piston 7 and suitably connected therewith, and have their adjacent ends passing through the head 9 of said piston and communicating with the cylinder 5, the pipes 43 and 44 being similarly arranged with respect to the piston 8 of the cylinder 6. By this construction the inlet pipe associated with each cylinder is adapted to discharge fluid pressure through the head of the piston associated with the said cylinder to impel the cylinder on its working stroke, to permit exhaust of the fluid pressure from the cylinder through the piston head on the return movement of said cylinder, said pipes being properly check valved to control the flow of fluid pressure, as shown.

It will thus be seen that the invention provides a compressed air motor whereby power may be communicated from a source of supply of fluid pressure in a simple and effective manner, and whereby under certain conditions the reservoir may be replenished, to secure greater economy in the operation of the engine.

Having thus described the invention, I claim:—

1. An engine comprising a source of fluid pressure supply, an engine shaft, a pair of stationary pistons, a pair of oppositely reciprocating cylinders coöperating therewith, gearing for imparting motion from the cylinders to the engine shaft on the working strokes of said cylinders, a driving shaft in gear with the engine shaft, a pair of valve casings each provided with a feed port and an exhaust port, said feed ports being in communication with said source of fluid pressure supply, fluid feed and exhaust ports leading from each casing to the associated cylinder, a rotary valve in each valve casing movable in opposite directions to connect the feed port and feed pipe and the exhaust port and exhaust pipe, respectively, said valves being movable in opposite directions for corresponding controlling actions, gears connected with the valves, a shaft carrying gears, one meshing with the valve gears, and rack teeth on the pistons meshing with the other gear upon said shaft for alternately imparting reverse movements to the valves on the opposite movements of the cylinders.

2. An engine comprising a source of fluid pressure supply, an engine shaft, means operated by fluid pressure from said source of supply to drive said shaft, a driving shaft in gear with the engine shaft, means for throwing the connecting gearing into and out of action, a pump having a delivery connection communicating with the source of fluid pressure supply, a sliding element connected with the pump piston, crank gearing for operating said sliding element, gearing on the driving shaft for actuating said crank gearing, and means for throwing said gearing into and out of operation.

In testimony whereof I affix my signature in presence of two witnesses.

DICK H. MURRAY.

Witnesses:
 JOHN F. PERRY,
 O. B. WHITE.